US011184562B2

(12) United States Patent
Akselrod et al.

(10) Patent No.: US 11,184,562 B2
(45) Date of Patent: *Nov. 23, 2021

(54) FRAMING ENHANCED REALITY OVERLAYS USING INVISIBLE LIGHT EMITTERS

(71) Applicant: International Business Machines Corporation, Armonk, NY (US)

(72) Inventors: Ben Z. Akselrod, Givat Shmuel (IL); Anthony DiLoreto, Markham (CA); Steve McDuff, Markham (CA); Kyle D. Robeson, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,969

(22) Filed: Feb. 4, 2020

(65) Prior Publication Data

US 2020/0177826 A1 Jun. 4, 2020

Related U.S. Application Data

(63) Continuation of application No. 15/977,004, filed on May 11, 2018, now Pat. No. 10,594,955, which is a continuation of application No. 15/151,819, filed on May 11, 2016, now Pat. No. 10,057,511.

(51) Int. Cl.
*H04N 5/33* (2006.01)
*H04N 5/225* (2006.01)

(52) U.S. Cl.
CPC ............. *H04N 5/33* (2013.01); *H04N 5/2256* (2013.01)

(58) Field of Classification Search
CPC ........................................................ H04N 5/33
USPC ........................................................ 345/633
See application file for complete search history.

(56) References Cited

U.S. PATENT DOCUMENTS

| 7,034,927 | B1 | 4/2006 | Allen et al. |
| 8,547,401 | B2 | 10/2013 | Mallinson et al. |
| 8,847,921 | B2 | 9/2014 | Huang et al. |
| 8,854,470 | B2 | 10/2014 | Park et al. |
| 9,183,807 | B2 | 11/2015 | Small |

(Continued)

FOREIGN PATENT DOCUMENTS

| EP | 1571839 A1 | 9/2005 |
| WO | 2010015881 A1 | 2/2010 |

OTHER PUBLICATIONS

"Microsoft HoloLens", Microsoft HoloLens Official Site, Printed Feb. 11, 2016, 7 pages, Copyright 2016 Microsoft, <https://www.microsoft.com/microsoft-hololens/en-us>.

(Continued)

*Primary Examiner* — Javid A Amini
(74) *Attorney, Agent, or Firm* — Joseph P. Curcuru (57) ABSTRACT

A method of generating an augmented reality environment, the method comprising, transmitting information of a target content to an augmented reality device using light generated by one or more light emitters. Responsive to a reception of the information of the target content by the augmented reality device, determining a portion of the target content for displaying on the physical display area, and displaying the portion of the target content as an overlay on the physical display area using the augmented reality device.

20 Claims, 3 Drawing Sheets

(56) References Cited

U.S. PATENT DOCUMENTS

| | | | |
|---|---|---|---|
| 9,286,730 B2 | 3/2016 | Bar-Zeev | |
| 10,057,511 B2* | 8/2018 | Akselrod | H04N 5/33 |
| 10,594,955 B2* | 3/2020 | Akselrod | H04N 5/33 |
| 2011/0018903 A1 | 11/2011 | Lapstun et al. | |
| 2012/0044264 A1 | 2/2012 | Lee | |
| 2013/0127980 A1 | 5/2013 | Haddick | |
| 2013/0278631 A1* | 10/2013 | Border | G02C 5/143 345/633 |
| 2013/0286053 A1 | 10/2013 | Fleck | |
| 2014/0111543 A1 | 4/2014 | Kim | |
| 2014/0160162 A1* | 6/2014 | Balachandreswaran | G06F 3/011 345/633 |
| 2014/0225916 A1 | 8/2014 | Theimer | |
| 2014/0232750 A1* | 8/2014 | Price | G06T 19/006 345/633 |
| 2014/0247278 A1 | 9/2014 | Samara | |
| 2014/0267411 A1 | 9/2014 | Fein | |
| 2014/0347394 A1 | 11/2014 | Padilla | |
| 2015/0002506 A1 | 1/2015 | Saarimaki et al. | |
| 2015/0046295 A1 | 2/2015 | Hart | |
| 2015/0199848 A1 | 7/2015 | Kim | |
| 2015/0262425 A1 | 9/2015 | Hastings | |
| 2016/0048964 A1 | 2/2016 | Kruglick | |
| 2016/0163108 A1 | 6/2016 | Kim | |
| 2017/0193300 A1* | 7/2017 | Shatz | H04N 5/23216 |
| 2017/0206691 A1* | 7/2017 | Harrises | G02B 27/0172 |
| 2018/0262700 A1 | 9/2018 | Akselrod | |
| 2020/0029030 A1* | 1/2020 | Akselrod | H04N 5/33 |

OTHER PUBLICATIONS

"Video Encoded Invisible Light", Wikipedia, the free encyclopedia, Printed Feb. 11, 2016, 2 Pages, <https://en.wikipedia.org/wiki/Video_Encoded_Invisible_Light>.

Akselrod et al., "Framing Enhanced Reality Overlays Using Invisible Light Emitters", U.S. Appl. No. 16/587,080, filed Sep. 30, 2019, 22 pages.

Grasset et al., "Edutainment with a Mixed Reality Book: a visually augmented illustrative children's book", ACE '08, Proceedings of the 2008 International Conference on Advances in Computer Entertainment Technology, 6 Pages, ACM New York, NY, Copyright 2008.

IBM, Appendix P, List of patents or patent applications treated as related, filed herewith, 2 pages.

Mekni et al., "Augmented Reality: Applications, Challenges and Future Trends", Applied Computational Science, ISBN: 978-960-474-368-1, printed Sep. 12, 2017, pp. 205-214.

Silva et al., "Introduction to Augmented Reality", National Laboratory for Scientific Computation, 11 Pages, Printed on Feb. 11, 2016.

Wang et al., "Infrared Marker based Augmented Reality System for Equipment Maintenance", 2008 International Conference on Computer Science and Software Engineering, IEEE Computer Society, Copyright 2008 IEEE, pp. 816-819.

* cited by examiner

FRAMING ENHANCED REALITY OVERLAYS USING INVISIBLE LIGHT EMITTERS

BACKGROUND

The present invention relates generally to the field of computing technology, and more particularly to augmented reality technology.

Generally speaking, augmented reality (AR) is a live integration of computer-generated digital information with a physical, real-world environment. The computer-generated digital information includes sound, video, graphics and other data by which the physical, real-world environment is augmented or overlaid. The augmented reality may be categorized as augmented reality 3D viewers, augmented reality browsers, and augmented reality games. Augmented reality is usually implemented with augmented reality devices, for example, smartphones and tablets with augmented reality apps.

SUMMARY

In one aspect of the present invention, a method of generating an augmented reality environment, the method comprising transmitting, by the one or more processors, information of a target content to an augmented reality device using light generated by one or more light emitters. Responsive to a reception of the information of the target content by the augmented reality device, determining, by the one or more processors, a portion of the target content for displaying on the physical display area, and displaying, by the one or more processors, the portion of the target content as an overlay on the physical display area using the augmented reality device.

In another aspect of the present invention, a system of generating an augmented reality environment, the system comprising: one or more computer processors, one or more computer readable storage devices, and program instructions stored on the one or more computer readable storage devices for execution by at least one of the one or more computer processors, the stored program instructions comprising, program instructions to transmit information of a target content to an augmented reality device using light generated by one or more light emitters. Responsive to a reception of the information of the target content by the augmented reality device, program instructions to determine a portion of the target content for displaying on the physical display area, and program instructions to display the portion of the target content as an overlay on the physical display area using the augmented reality device.

In another aspect of the present invention, a computer program product of generating an augmented reality environment, the computer product comprising: one or more computer readable storage devices and program instructions stored on the one or more computer readable storage devices, the stored program instructions comprising: program instructions to transmit information of a target content to an augmented reality device using light generated by one or more light emitters. Responsive to a reception of the information of the target content by the augmented reality device, program instructions to determine a portion of the target content for displaying on the physical display area, and program instructions to display the portion of the target content as an overlay on the physical display area using the augmented reality device.

DETAILED DESCRIPTION

Embodiments of the present invention recognize the use of invisible light emitters to frame enhanced reality overlays. Embodiments of the present invention provide transmission of reality overlays/contents as encoded light-based data stream using the invisible light to an augmented reality device. Embodiments of the present invention provides a determination of content to be displayed in a framed area by the augmented reality device. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
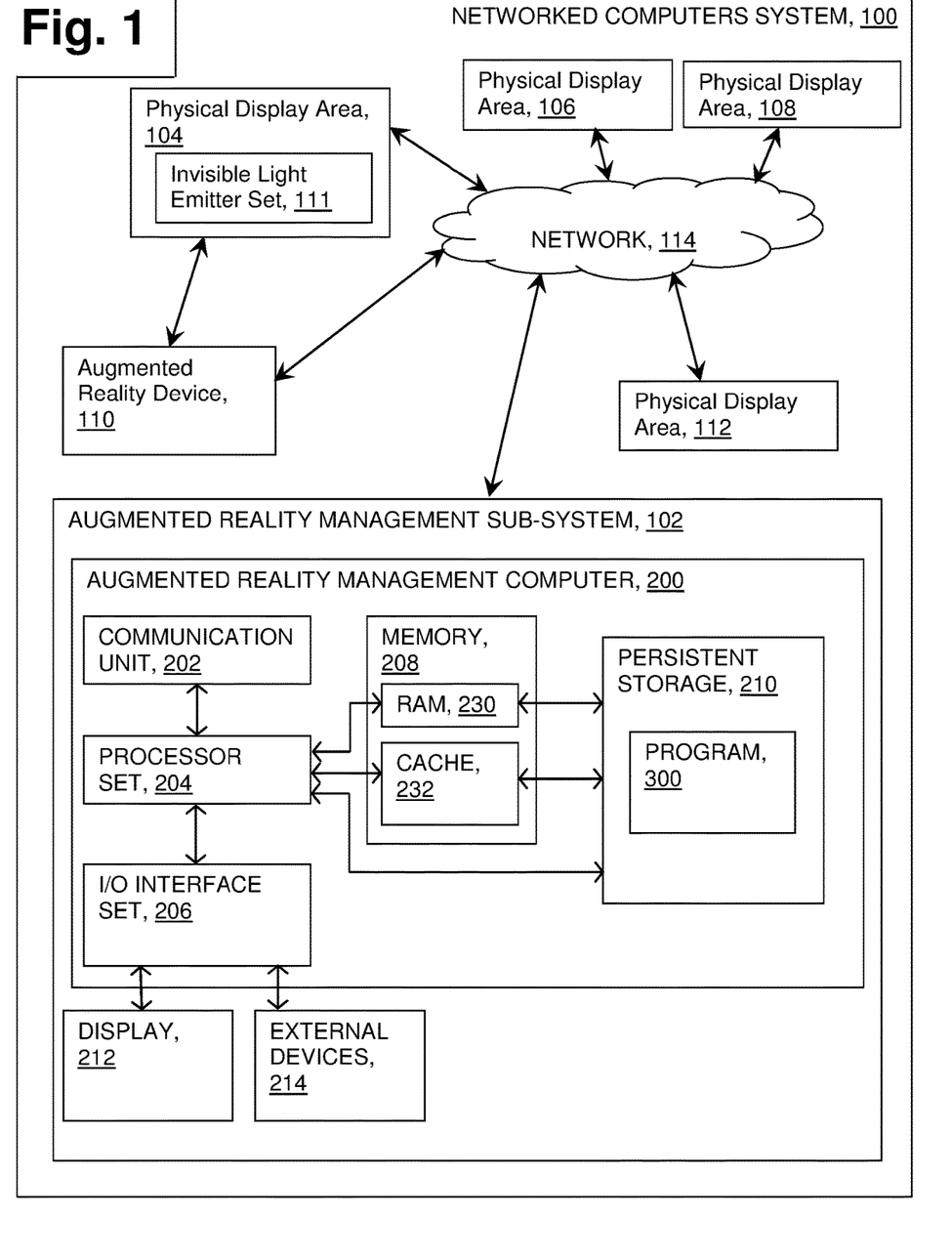
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: augmented reality management sub-system 102; physical display areas 104, 106, 108, 112; augmented reality device 110; invisible light emitter set 111; communication network 114; augmented reality device management computer 200; communication unit 202; processor set 204; input/output (I/O) interface set 206; memory device 208; persistent storage device 210; display device 212; external device set 214; random access memory (RAM) devices 230; cache memory device 232; and program 300.

Physical display areas 104, 106, 108, 112 may communicate, by means of their respective emitter(s) (such as emitter 111 on physical display area, emitters on physical display areas 106, 108, 112 are not shown), with the augmented reality management sub-systems 102 via network 114. Physical display areas 104, 106, 108 112 may communicate, using invisible light by means of their respective emitters, with augmented reality device 110 (such as shown between physical display area 104 and augmented reality device 110). As used herein, invisible light is light of a select frequency or range of frequencies that is not visibly perceptible by a human being. One example of such light frequency range may be from about 300 GHz to about 430 THz (the corresponding wavelength ranging from about 1 mm to about 700 nm). Alternatively, physical display areas 104, 106, 108, 112 may communicate with their respective augmented reality devices. Further, augmented reality devices may communicate with the augmented reality management sub-system 102 via network 114.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Alternatively, a portion of program 300 may be stored in emitters of physical display areas 104, 106, 108, and 112. Further, alternatively, a portion of program 300 may be stored in augmented reality devices, such as augmented reality device 110. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to send a target content that is to be overlaid to an augmented reality device using invisible light. The target content is overlaid by the augmented reality device on a location defined by invisible light emitters. Oftentimes, the location is within a physical display area, as discussed further below. Alternatively, the location is adjacent a physical structure on which the invisible light emitters are mounted. The target content is delivered in such a way that the content is within the field of vison of the augmented reality content area.

Some embodiments of the present invention recognize the following facts, potential problems and/or potential areas for improvement with respect to the current state of the art: (i) the conventional augmented reality devices are preloaded with target contents; and/or (ii) multiple users face challenges seeing a same image on a display area at a same location.

With augmented reality, content producers may prefer to send feeds of data to overlay on specific areas of the physical world. Examples of such areas of the physical world may include billboards and signs for dynamic and targeted advertising, for example, a series of graphical images are overlaid on a display board. Further, content producers may desire to overlay the data without having a user's augmented reality display device pre-loaded with the data and related information. Further, such scenario becomes more complex when multiple users to see the image (e.g., advisements) at precisely the same location. Further, size and shape of the overlaid physical area may dynamically change based on the actual overlaid contents.

Some embodiments of the present invention provide a way to use light of a select range of frequencies (e.g., light in the infrared range) emitters that transmit light-based data streams in physical areas. In some such embodiments, these data streams describe physical dimensions and content information that is picked up by augmented reality devices to determine what to overlay on top of a physical location. In general, in such embodiments, light of a given frequency that is not visibly perceptible by humans is used to transmit light-based data streams so that, at least to an acceptable level, i.e., at or below a threshold, it i) does not affect a person's vision, ii) does not distract from what (e.g., advertisement images) may be physically there, and iii) does not require a wireless signal that a receiver needs to listen on.

In some embodiments, the augmented reality devices are stationary while the display physical areas are dynamically moving. For example, a user stands on a street corner and a bus drives by. The bus has four emitters on the side to outline a large advertisement area, and the user is able to see the advertisement (e.g., image, video, etc.) on the area as dictated by the bus emitters. Alternatively, the augmented reality devices are dynamically moving while the physical display areas are stationary. For example, a user wears an augmented reality device and rides in a car driving by a billboard. The billboard has emitters outlining the billboard area and the augmented reality device display the advertisement (e.g., image, video, etc.) to the user. Further, alternatively, both the augmented reality devices and the physical display areas are dynamically moving with or without certain relative movement relationship. For example, by combining the above two examples, a user can be in a moving car wearing an augmented reality device and observe a virtual advertisement provided by emitters on a bus moving past the user. One skilled in the art recognizes that there are many possible methods that may be implemented to determine i) the relative position of a user to the emitters and ii) the relative changes between the position of the emitters and the user. For example, using changes in the determined distances between the user and two different emitters, iterative triangulation may be employed to determine a series of positions of the user relative to the emitters, from which the rate of change for that position may be derived. As such, the displayed advertisement is dynamically oriented such that it is viewable by the user as the car and bus pass within a range of distance of one another.

Figure 2:
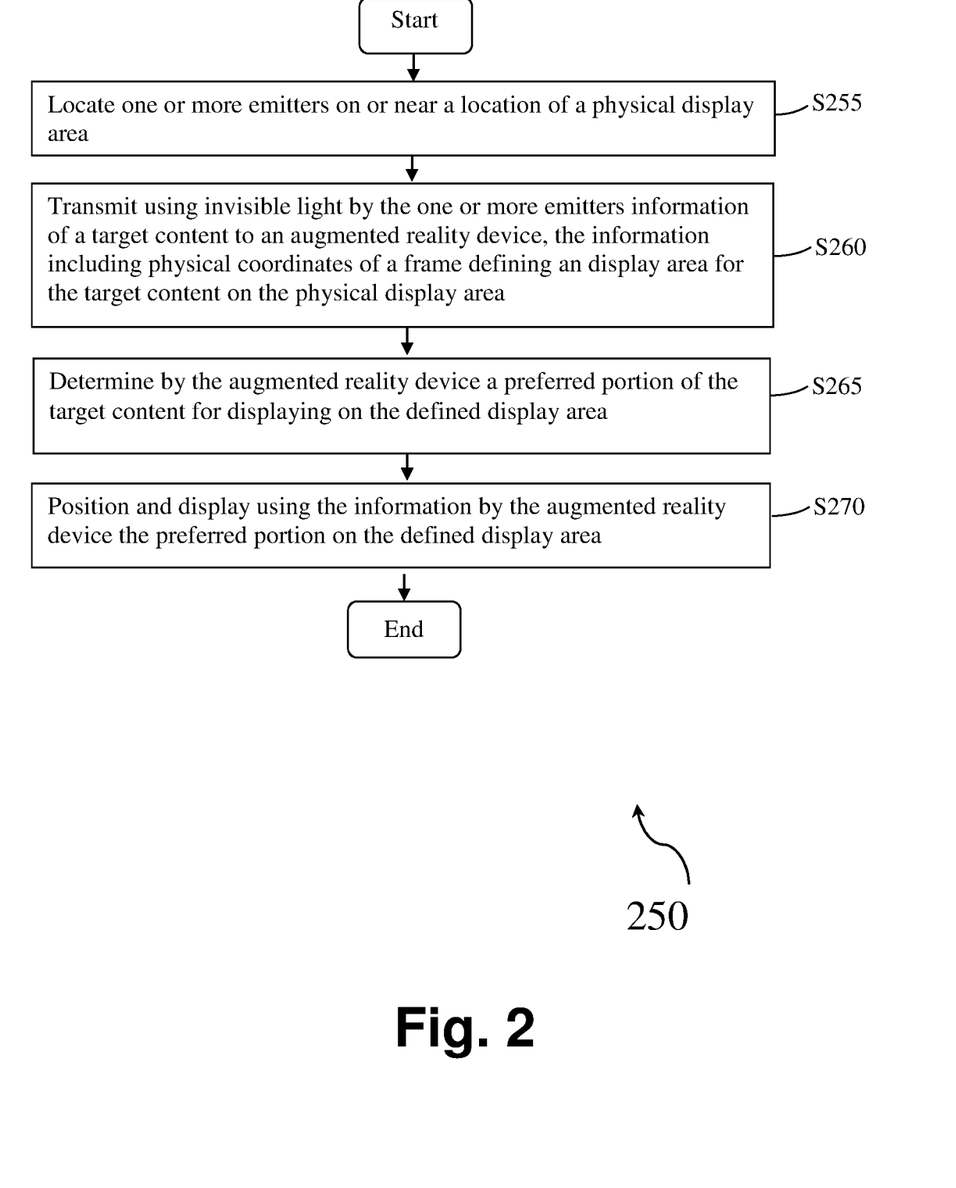
FIG. 2 is a flowchart depicting an embodiment of a method that may be performed, at least in part, by the system depicted in FIG. 1.
Figure 3:
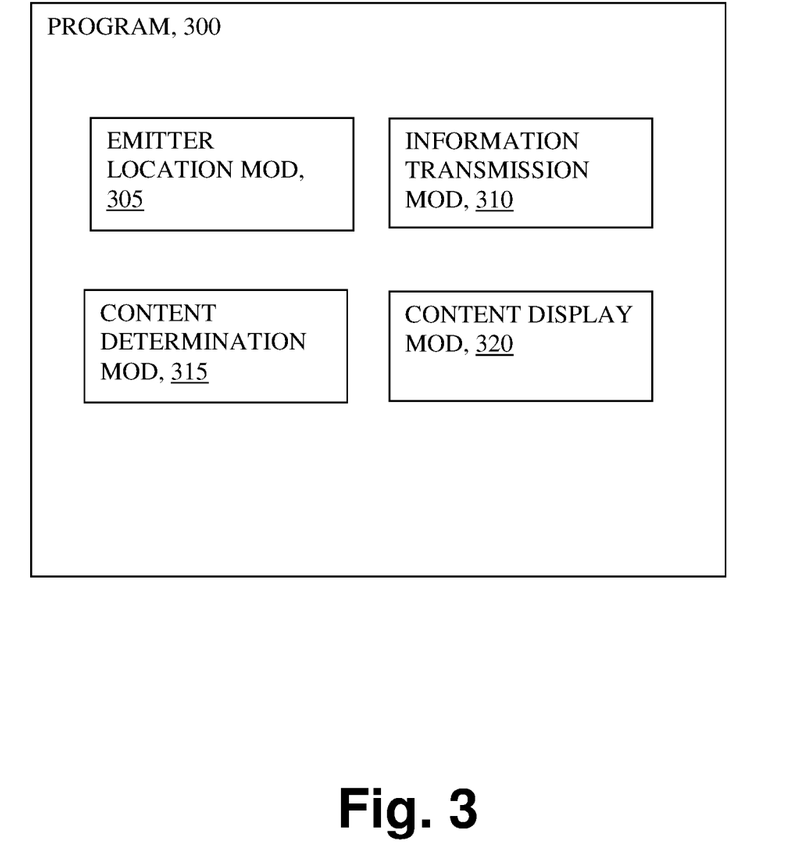
FIG. 3 is a schematic view of a machine logic (for example, software) portion of the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where emitter location module ("mod") 305 locates one or more emitters on or near a location of a physical display area. In this example, emitter 114 is placed or installed on a position of physical display area 104, for example, a corner of physical display area 104. Alternatively, more than one emitter may be installed in a preferred order and/or positions on the physical display area 104. Further, one or more emitters (not shown in FIG. 1) may be positioned on physical display areas 106, 108, 112. The physical display areas 104, 106, 108 and 112 can be any physical surface, including, but are not limited to, billboards, shopping mall boutique windows (such as transparent display windows), traffic signs, and exterior building walls.

Processing proceeds to step S260, where information transmission module 310 transmits information of a target content to an augmented reality device. The transmission is performed using invisible light by the one or more emitters. The information includes physical coordinates of a frame defining a display area for the target content on the physical display area. In this example, emitter 114 encodes the target content using invisible light (such as, infrared) and sends the encoded light-based data stream to augmented reality device 110. The augmented reality device may include an infrared camera and/or any other suitable sub-system device to catch and receive the invisible light-based data stream. The target content may be encoded with an invisible light using any suitable encoding method or algorithm such as varying the light intensity by modulating the amplitude of the invisible light. Alternatively, the target content may be encoded by strobing the light (i.e., flashing on and off) to represent a basic binary transmission.

The target content is either actual content data that will be overlaid, such as a video or a still image, or metadata including a URL (uniform resource locator) from which an augmented reality device may connect to access additional content. The information including physical coordinates of the frame and the target content may be programmed by program 300 through network 114.

Alternatively, one or more emitters on physical display areas 106, 108, and 112 may transmit invisible light-based data streams to augmented reality device 110. Alternatively, one or more emitters on physical display areas 106, 108, and 112 may transmit invisible light-based data streams to their respective augmented reality device (not shown in FIG. 1). Processing proceeds to step S265, where content determination module 315 determines by the augmented reality device a preferred portion of the target content for displaying on the defined display area. In this example, the augmented reality device 110 determines where and what to overlay the physical display area 104. The physical coordinates of the fame are used to determine the precise position and physical dimension of the defined display area on the physical display area 104. In a scenario where metadata such as a URL is transmitted instead of actual content data, the augmented reality device 110 will connect with network 114 to load automatically an appropriate web page with further information. With this further information, the augmented reality device 110 determines what to overlay/display (such as a video or image).

Processing proceeds to stop at step S270, where content display module 320 position and display using the information by the augmented reality device the preferred portion on the defined display area. In this example, after determination in step S265, the augmented reality device 110 uses the information to position and display the content on top of physical space, i.e., the display area defined by the physical coordinates of the fame.

In some embodiments of the present invention, multiple invisible light emitters are placed on a physical display area, each emitter representing a distinct point in a frame. An example is four emitters that represent the four corners of a frame. In one such scenario and embodiment, the physical coordinates of a defined display area on which the target content will be overlaid is derived by the physical location of the four emitters. In one example and embodiment, to transmit the content information, a fifth emitter configured to transmit the content data is placed within the frame of the other four emitters. In another example and embodiment, to transmit the content information, all four emitters are configured to transmit the content data.

Some embodiments of the present invention may include one, or more, of the following features, characteristics and/or advantages: (i) invisible light used to encode and transmit content data; (ii) the physical images on a display board are not affected visibly, as seen by a human; and/or (iii), a wireless signal is not required for an augmented reality device to receive the content to be overlaid.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for generating an augmented reality environment, the method comprising:
    transmitting, by the one or more processors, information of a target content to an augmented reality device using light generated by the one or more light emitters, wherein the information includes a light-based data stream of the target content and the target content is not pre-loaded, wherein metadata is transmitted instead of actual content data, and wherein the augmented reality device automatically loads a web page with further target content information; and
    displaying, by the one or more processors, the portion of the target content as an overlay on the physical display area using the augmented reality device.

2. The method of claim 1, wherein the physical display area is in communication with the augmented reality device and the augmented reality device lacks the target content until the target content is received via transmission using light generated by the one or more light emitters and wherein the communication by the one or more light emitters is done using invisible light.

3. The method of claim 1 further comprising:
    determining, by the one or more processors, a portion of the target content for displaying on the physical display area based the information of the target content.

4. The method of claim 1, wherein the portion of the target content is done by an owner of the physical display area.

5. The method of claim 1, wherein displaying the portion of the target content further comprises light emitted by the one or more light emitters includes a light-based data stream that is encoded as part of light from the one or more light emitters by modulating an amplitude of that light, wherein the one or more light emitters emit invisible light.

6. The method of claim 1 further comprising:
    locating, by one or more processors, one or more light emitters proximate to a location of a physical display area.

7. The method of claim 1, wherein the transmitted information includes physical coordinates of a frame defining a display area for the target content on the physical display area, wherein the display area defined by the frame is less than or equal to the physical display area.

8. A computer system for generating an augmented reality environment, the system comprising:
    one or more computer processors;
    one or more computer readable storage devices;
    program instructions stored on the one or more computer readable storage devices for execution by at least one of the one or more computer processors, the stored program instructions comprising:
    program instructions to transmit information of a target content to an augmented reality device using light generated by one or more light emitters, wherein the information includes a light-based data stream of the target content and the target content is not pre-loaded, wherein metadata is transmitted instead of actual content data, and wherein the augmented reality device automatically loads a web page with further target content information; and
    program instructions to display the portion of the target content as an overlay on the physical display area using the augmented reality device.

9. The computer system of claim 8, wherein the physical display area is in communication with the augmented reality device and the augmented reality device lacks the target content until the target content is received via transmission using light generated by the one or more light emitters and wherein the communication by the one or more light emitters is done using invisible light.

10. The computer system of claim 8 further comprising:
    program instructions to determine a portion of the target content for displaying on the physical display area based the information of the target content.

11. The computer system of claim 8, wherein the portion of the target content is done by an owner of the physical display area.

12. The computer system of claim 8, wherein displaying the portion of the target content further comprises light emitted by the one or more light emitters includes a light-based data stream that is encoded as part of light from the one or more light emitters by modulating an amplitude of that light, wherein the one or more light emitters emit invisible light.

13. The computer system of claim 8 further comprising:
    program instructions to locating, by one or more processors, one or more light emitters proximate to a location of a physical display area.

14. The computer system of claim 8, wherein the transmitted information includes physical coordinates of a frame defining a display area for the target content on the physical display area, wherein the display area defined by the frame is less than or equal to the physical display area.

15. A computer program product for generating an augmented reality environment, the computer product comprising:
    one or more computer readable storage devices and program instructions stored on the one or more computer readable storage devices, the stored program instructions comprising:
    program instructions to transmit information of a target content to an augmented reality device using light generated by one or more light emitters, wherein the information includes a light-based data stream of the target content and the target content is not pre-loaded, wherein metadata is transmitted instead of actual content data, and wherein the augmented reality device automatically loads a web page with further target content information; and
    program instructions to display the portion of the target content as an overlay on the physical display area using the augmented reality device.

16. The computer product of claim 15, wherein the physical display area is in communication with the augmented reality device and the augmented reality device lacks the target content until the target content is received via transmission using light generated by the one or more light emitters and wherein the communication by the one or more light emitters is done using invisible light.

17. The computer product of claim 15 further comprising:
program instructions to determine a portion of the target content for displaying on the physical display area based the information of the target content.

18. The computer product of claim 15, wherein the portion of the target content is done by an owner of the physical display area.

19. The computer product of claim 15, wherein displaying the portion of the target content further comprises light emitted by the one or more light emitters includes a light-based data stream that is encoded as part of light from the one or more light emitters by modulating an amplitude of that light, wherein the one or more light emitters emit invisible light.

20. The computer product of claim 15 further comprising:
program instructions to locating, by one or more processors, one or more light emitters proximate to a location of a physical display area.

* * * * *